Patented Apr. 20, 1937

UNITED STATES PATENT OFFICE 2,077,409

CATALYTIC HYDROGENATION OF FURFURAL

George De Witt Graves, Wilmington, Del., assignor to E. I. du Pont de Nemours & Company, Wilmington, Del., a corporation of Delaware No Drawing. Application September 16, 1931, Serial No. 563,216

4 Claims. (Cl. 260—54)

This invention relates to the art of hydrogenating furfural and more particularly to its catalytic reduction in the liquid phase to form furfuryl alcohol.

The hydrogenation of furfural and examination of its reduction products have been studied by several investigators. Nickel, platinum, palladium, and oxides of platinum have been suggested as catalysts. Nickel catalysts in particular, have been used by Padoa and Ponti, (Chemische Centralblatt 1907, part 1, page 570) who have reduced furfural to furfuryl alcohol in the vapor phase at 190° C. Ricard and Guinot (French Patent 639,756 and U. S. Patent 1,739,919) disclose a method for the preparation of furfuryl alcohol which comprises passing furfural in the vapor phase over copper catalysts with excesses of hydrogen. Kaufman and Adams (Jour. Amer. Chem. Soc. 45, 3029 (1923), have obtained furfuryl alcohol by liquid phase reduction using platinum oxide catalyst:

One object of this invention is to provide a liquid phase catalytic process for the hydrogenation of furfural to valuable alcohols. Another object is to provide a catalytic process whereby furfural is selectively reduced to furfuryl alcohol, leaving the unsaturated linkages of the furane ring intact.

These objects are accomplished by the following invention which comprises subjecting furfural in the liquid state to the action of hydrogen at elevated temperatures and pressures, and in the presence of a copper containing catalyst having a hydrogenating effect whereupon hydrogen is added to the aldehyde group to form the hydroxy radical.

The following examples of this invention are included merely for purposes of illustration but are not to be regarded as limitations.

Example 1

A catalyst comprising metallic copper at least partly supported on zinc oxide was prepared by precipitating a solution containing equal parts of zinc nitrate and copper nitrate with an excess of ammonium oxalate. The mixed copper-zinc oxalates were filtered, washed, and dried at 110° C. They were then subjected to reduction with hydrogen at a temperature of 250°–350° C., causing reduction of the copper oxalate to metallic copper. A small autoclave was charged with 75 grams of distilled furfural and 10 grams of the copper-zinc catalyst prepared as described above. Using a hydrogen pressure of 2000 lbs./sq. inch, fixation was observed to begin at about 85° C. but to continue very slowly until the temperature was raised to 130°–140° C. It was finally held at 150°–160° C. for two hours. Considerable mechanical loss was encountered in this run but an examination of the product revealed only 2 grams of unchanged furfural, 54 grams of furfuryl alcohol, and a small amount of higher boiling material.

Example 2

A supported copper catalyst was prepared as follows: The excess ammonia in a solution containing 483 grams of copper nitrate and 1260 cc. of 28% ammonium hydroxide and containing in suspension 60 grams of finely divided kieselguhr was discharged by blowing with steam and air. When the solution was neutral the kieselguhr-copper hydroxide mixture was filtered off, washed, and dried. It was then subjected to reduction with hydrogen to reduce the copper hydroxide to metallic copper at a maximum temperature of 200° C. One hundred fifty grams of furfural, 25 grams of water and 12 grams of the kieselguhr supported copper prepared as described above were agitated at 150° C. for a period of 3.25 hours. An initial hydrogen pressure of 2000 lbs./sq. inch was used but this was permitted to drop to nearly 1000 lbs./sq. inch as the reaction progressed, being then built up to the initial pressure again from an outside pressure storage. One hundred eighty-three grams of product were recovered, filtered and the filtrate distilled. 7.3% of the original furfural was found unchanged, and 53.5% was converted to furfuryl alcohol. No tetrahydrofurfuryl alcohol was isolated but the product contained 15% of higher boiling material.

Example 3

A copper-zinc catalyst supported on kieselguhr was prepared by the method described above under Example 2. The solution from which the excess ammonia was discharged in this case contained 1 gram mol. each of copper nitrate and zinc nitrate with sixty grams of kieselguhr in suspension. The precipitate after filtration was washed, dried, and reduced with hydrogen at a temperature of 200°–300° C. Two hundred grams of vacuum distilled furfural, 100 grams of water, and 20 grams of the supported copper-zinc catalyst prepared as described above in Example 3, were charged into a small pressure vessel and subjected to a hydrogen pressure of 1800 lbs./sq. inch. The above charge was agitated violently for 2.5 hours during which time the temperature was maintained at 150° C. Hydrogen absorption had ceased when the run was shut down. Three hundred grams of product were recovered, the catalyst removed by filtration, and the filtrate distilled. Five per cent of the original furfural was recovered unchanged, and 70.5% was converted to furfuryl alcohol. A spongy black residue remained after distillation.

The success of the process depends to a large degree upon the efficiency with which the catalyst, the furfural and the hydrogen gas are brought in contact with one another. Proper agitation may be effected by internal stirring, as in an autoclave, or the entire vessel may be agitated externally. In fact, any method whereby the gas, liquid and catalyst are brought in intimate contact will expedite the reaction. The reduction of furfural can be effected at temperatures as low as 85°–100° C. and at a temperature as high as the critical temperature at which furfural will no longer remain liquid under the pressure used, but a temperature between 140° C. and 160° C. is preferable because of the fact that temperatures much in excess of 160° C. are usually accompanied by the formation of excessive amounts of undesirable higher boiling products and because temperatures much below 140° C. give very low reduction rates.

The relatively large proportions of catalyst employed in the above examples should not be understood to be necessary for furfural reductions, but are used to cut down the reaction time. After filtration from the product, the catalyst may be re-used for several subsequent reductions.

Similarly, the use of moderately high pressures is advantageous because it also increases the rate of hydrogenation with a beneficial effect on the yield of the desired production. It is preferred to operate at pressures between 1000 and 2000 lbs./sq. inch, but successful operation is possible as low as 100 lbs./sq. inch. The upper pressure is, of course, limited only by the strength of the reaction vessel.

In several of the above examples varying amounts of water have been included in the charge since its use in the reduction of furfural to tetrahydrofurfuryl alcohol has been found by Graves (U. S. Patent 1,794,453) to give increased yields and low amounts of higher boiling materials. Its use, however, is not essential for the success of this invention.

The process of the present invention is a liquid phase process. By maintaining the furfural in the liquid state during the reaction, the formation of carbon is kept at a minimum, and the yield of furfuryl alcohol is greatly enhanced and the formation of undesirable products such as methyl furane and the like is suppressed.

In carrying out the hydrogenation of furfural to furfuryl alcohol, it is preferred to use powdered metal catalysts containing copper which have been precipitated on any of the well known supporting materials such as pumice, silica gel, carbon, kieselguhr, fuller's earth, etc. Moreover promoted copper catalysts, e. g., catalysts containing both copper and zinc are highly efficient. Although this invention has been specifically described with relation to the use of metallic copper as a catalyst, still other copper-containing materials, such as copper salts having a hydrogenating effect are contemplated within the scope of the invention. As a copper salt suitable in this catalytic reduction mention is made of copper chromite. The term "copper-containing catalyst" as used in the specification and claims is intended to include both metallic copper and catalytic mixtures containing copper either physically or chemically combined therewith, and exerting a definite catalytic hydrogenating effect.

It will be apparent that this invention possesses several advantages, one of the principal of which is the selective nature of the hydrogenating effect of the copper catalyst which permits the addition of 1 mol. of hydrogen to the aldehyde radical without saturating the furane ring, when the hydrogenation is carried on in the liquid phase.

The reduction products of furfural which are described in the prior art are, in most cases, complex mixtures and in the case of liquid phase processes, generally contain a preponderance of tetrahydrofurfuryl alcohol. The use of a copper-containing catalyst in liquid phase hydrogenation of furfural gives a product high in furfuryl alcohol and containing small percentages of unchanged furfural and little, if any, of the tetrahydro-derivative. Methyl furane, a by-product found when copper is used in the vapor phase, is not formed to an appreciable extent under the conditions used in this invention.

It is obvious that this invention has certain other advantages. The use of such catalysts as are specifically described above, which permit operation in the liquid phase, largely eliminates the formation of carbon and solid products which so frequently are encountered in vapor phase processes. Furthermore, localized overheating which in part at least is responsible for the appearance of high boiling products is easily overcome in liquid phase operation.

Furfuryl alcohol possesses valuable properties from an industrial standpoint and heretofore has been successfully prepared only on a laboratory scale. This invention makes furfuryl alcohol available by a simple and relatively cheap process which can be easily adapted to commercial scale operation.

The invention is capable of considerable modification. The description and specific examples are to be considered as illustrative only, and any variations therefrom which conform to the spirit of the invention are intended to be included within the scope of the claims.

I claim:

1. The process of producing furfuryl alcohol which comprises reacting liquid furfural and hydrogen in the presence of a catalyst consisting of copper supported on zinc oxide.

2. The process of producing furfuryl alcohol which comprises reacting liquid furfural and hydrogen in the presence of a catalyst of metallic copper at least partially supported on zinc oxide, said catalyst being obtained by the process which consists in adding ammonium oxalate to a solution containing zinc nitrate and copper nitrate so as to precipitate a mixture of copper and zinc oxalates, filtering and washing the precipitate and drying same at about 110° C., heating the dried precipitate in an atmosphere of hydrogen at a temperature of about 250° to about 350° C., thus causing the reduction of the copper oxalate to metallic copper and of the zinc oxalate to zinc oxide.

3. The process in accordance with claim 1 characterized in that the reaction is carried out at a pressure of at least 100 pounds per square inch and at a temperature in excess of 80° C.

4. The process in accordance with claim 2 characterized in that the liquid furfural is hydrogenated at a temperature of about 130° C. to about 160° C. and at a pressure of about 1000 to about 2000 pounds per square inch.

GEORGE DE WITT GRAVES.